United States Patent [19]
Elliott, Sr

[11] Patent Number: 4,702,509
[45] Date of Patent: Oct. 27, 1987

[54] LONG-HAUL VEHICLE STREAMLINE APPARATUS

[76] Inventor: Morris C. Elliott, Sr, 11723 Norino, Whittier, Calif. 90601

[21] Appl. No.: 866,916

[22] Filed: May 27, 1986

[51] Int. Cl.$^4$ ............................................. B62D 35/00
[52] U.S. Cl. .................................. 296/1 S; 137/523; 137/543
[58] Field of Search .................... 296/1 S; 137/523 X, 137/542, 543 X

[56] References Cited

U.S. PATENT DOCUMENTS

| | | | |
|---|---|---|---|
| 2,463,516 | 3/1949 | Burkhardt | 137/523 |
| 3,912,323 | 10/1975 | Dancik | 296/164 |
| 3,934,922 | 1/1976 | MacCready, Jr. et al. | 296/1 S |
| 3,945,677 | 3/1976 | Servais | 296/1 S |
| 4,030,779 | 6/1981 | Johnson | 296/1 S |
| 4,088,362 | 5/1978 | Mollura | 296/1 S |
| 4,142,755 | 3/1979 | Keedy | 296/1 S |
| 4,257,641 | 3/1981 | Keedy | 296/1 S |
| 4,509,786 | 4/1985 | Gregg | 296/1 S |

OTHER PUBLICATIONS

"Wind Tunnel Tests Shape Economics of Truck Design", il Roads and Streets 117:39 N'74.
"New Air Drag Reducing Equipment" il Diesel Equipment Superintendent 52:46-7 D'74.
"Aerodynamic Drag Reduction Tests" Steers, Louis L. et al., SAE Prepr n 750703 for meeting Aug. 11-14, 1975 — 13 pages.
"Comparison of Reduction of Aerodynamic Drag", Buckley, Frank T., Jr. Univ. of Maryland, Balt. SAE Prepr n 750704 for mtg. 8/11-14/75, 11 pages.
"Wind Tunnel Development of the Dragfoiler", Mason, Wm. T1, Jr. of Gen. Motors. SAE Prepr n 750705 for meeting Aug. 11-14, 1975 —21 pages.

*Primary Examiner*—Robert R. Song
*Attorney, Agent, or Firm*—Sheldon & Mak

[57] ABSTRACT

Apparatus for streamlining a tractor-trailer truckcomprises an inflatable balloon bag member at an end of the trailer. Supporting attachments for the bag automatically lock when the bag member is inflated but may be easily disconnected once the bag is deflated. The attachments are hinged for loading door clearance, a top attachment being hinged forwardly of the end for swinging the deflated bag to one side of the trailer. A belt timber reenforces the bag between the attachments, the bag being otherwise self-supporting. Both front and rear bag members cooperate to significantly reduce aerodynamic drag and fuel consumption on long hauls.

20 Claims, 21 Drawing Figures

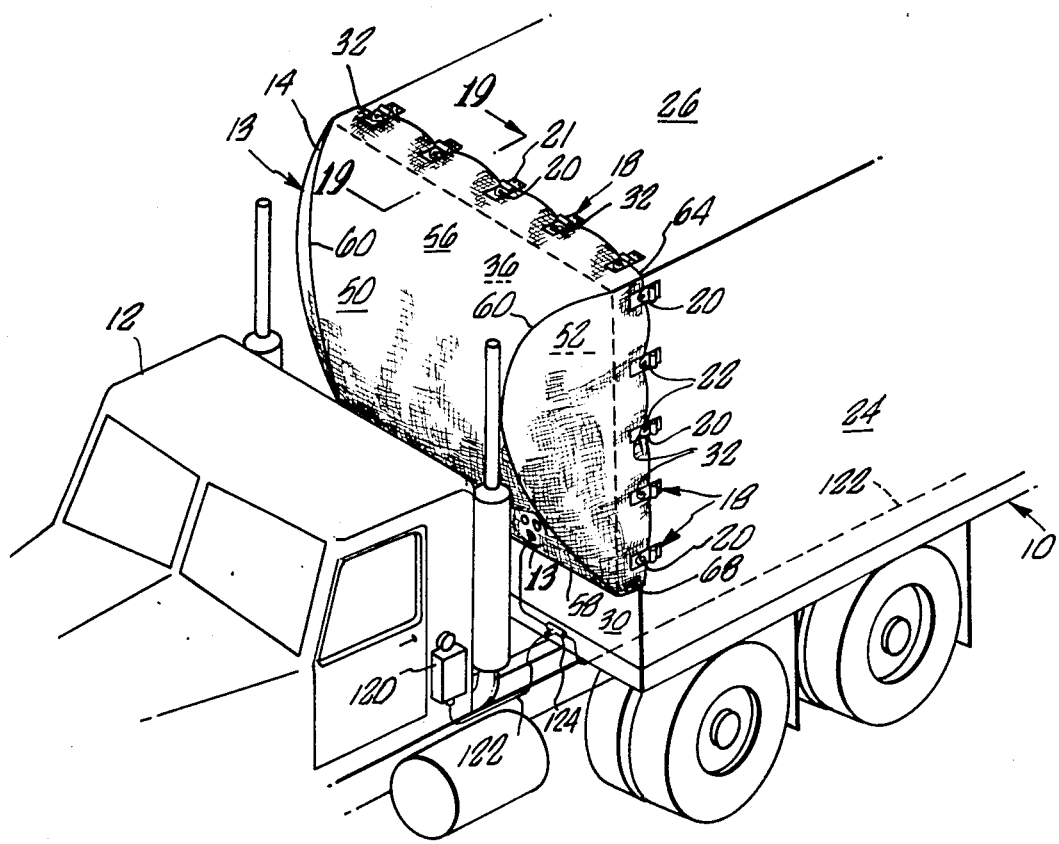
FIG. 5.
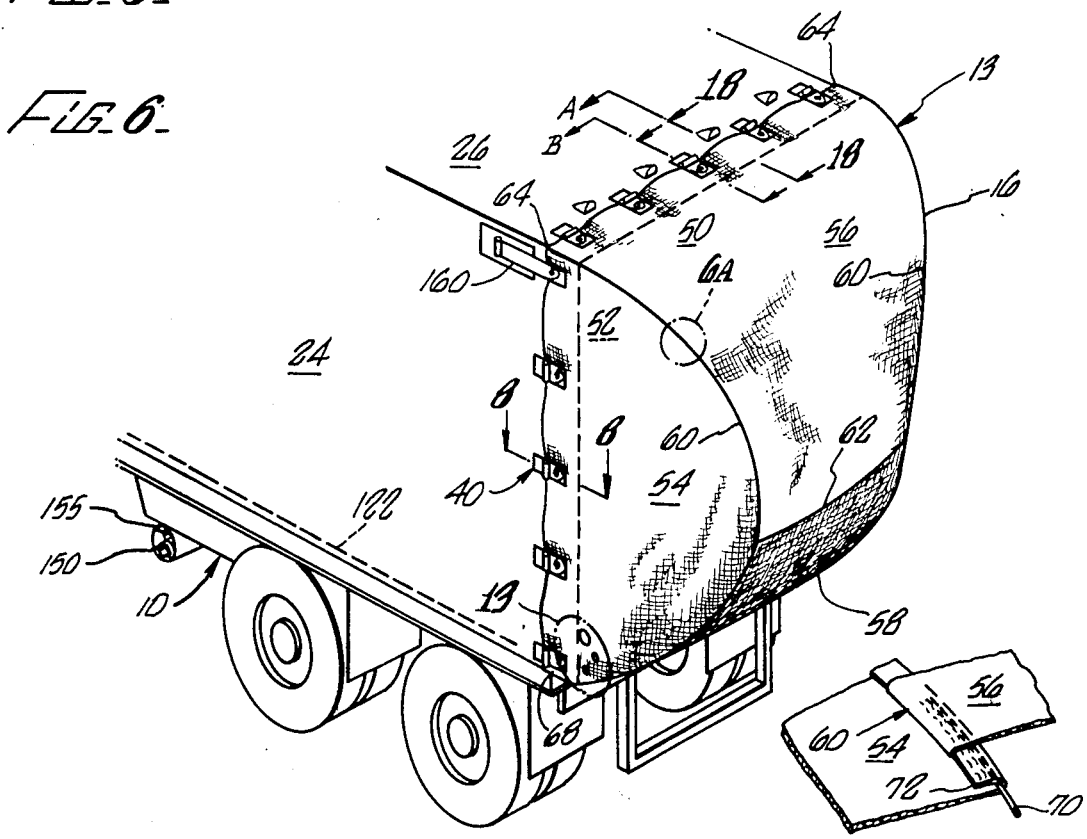
FIG. 6.
FIG. 6A.

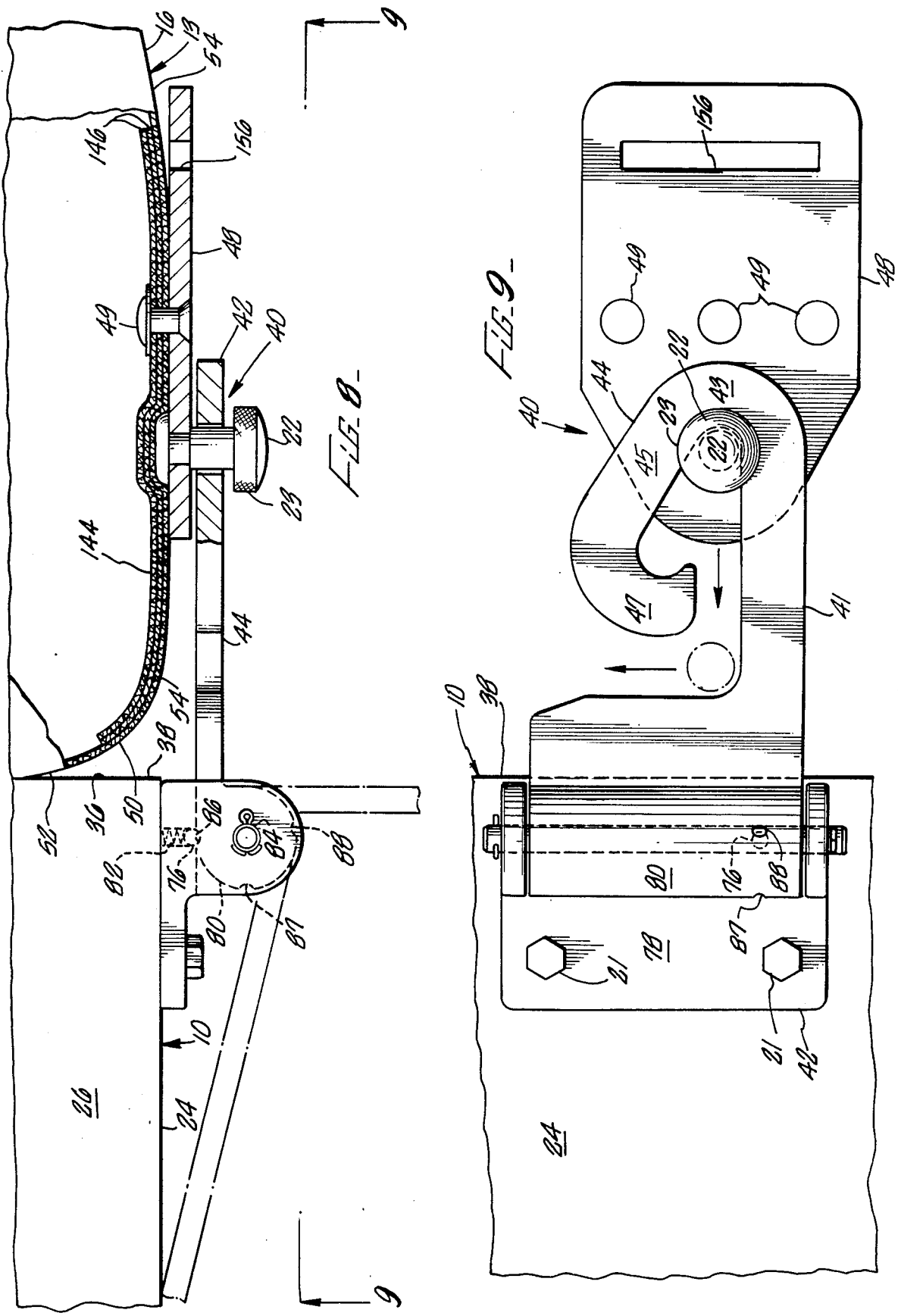

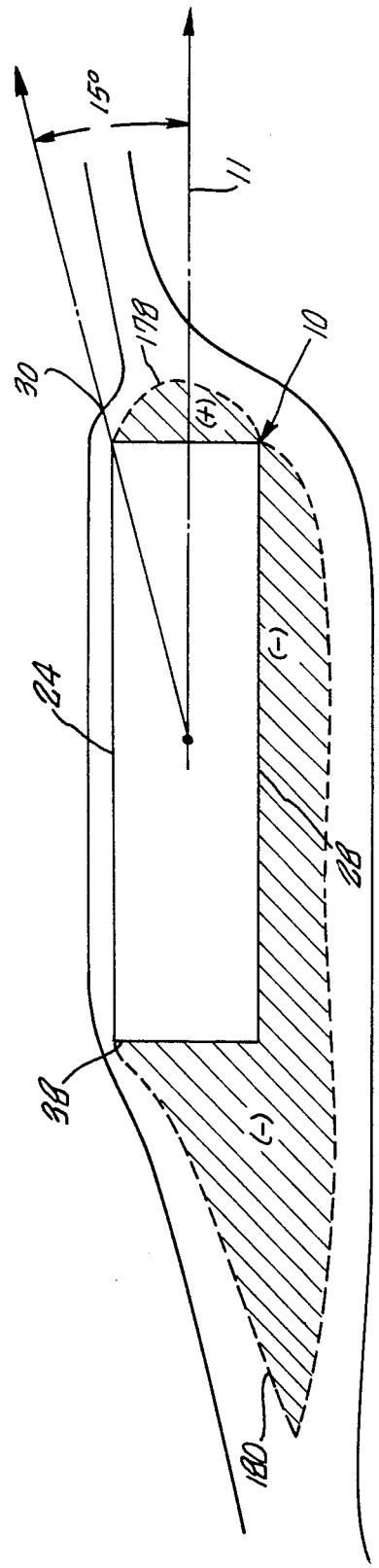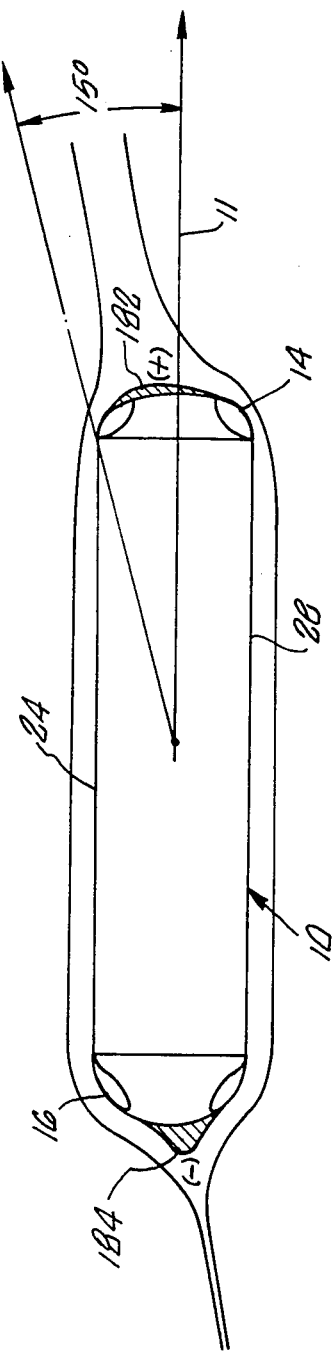

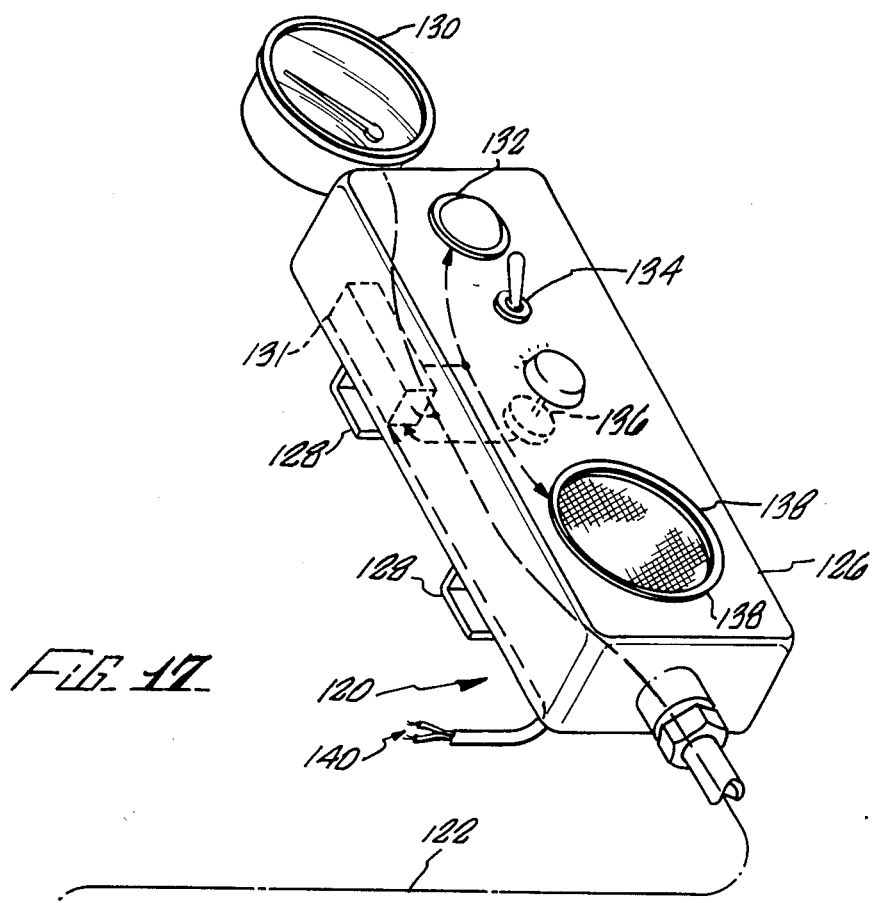
Fig. 17
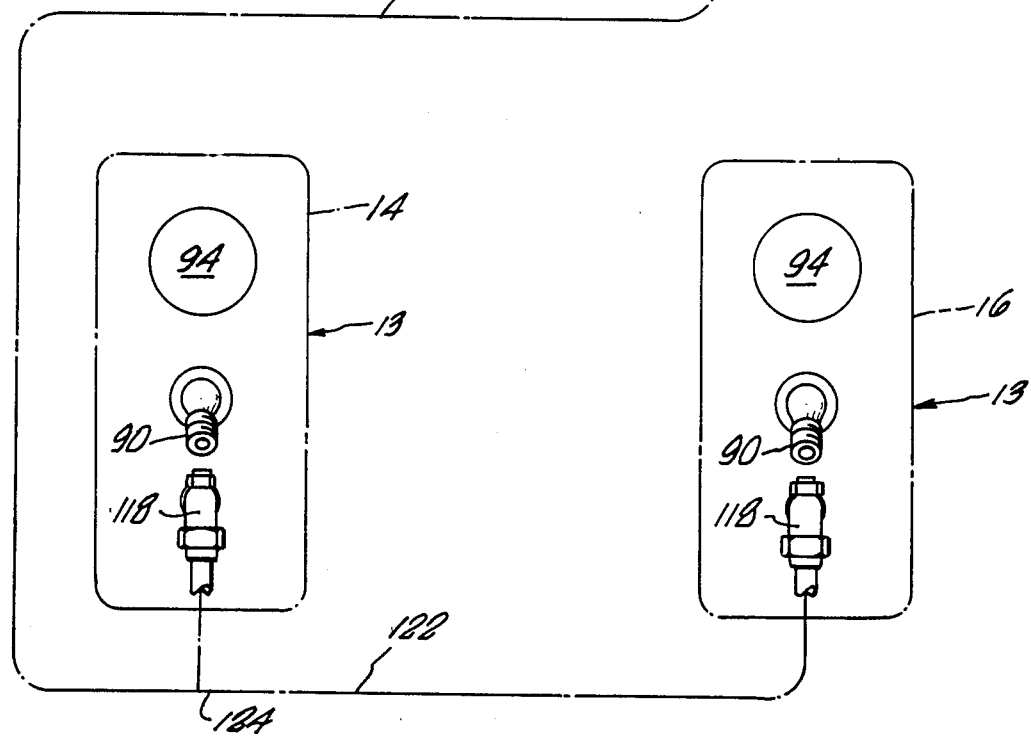

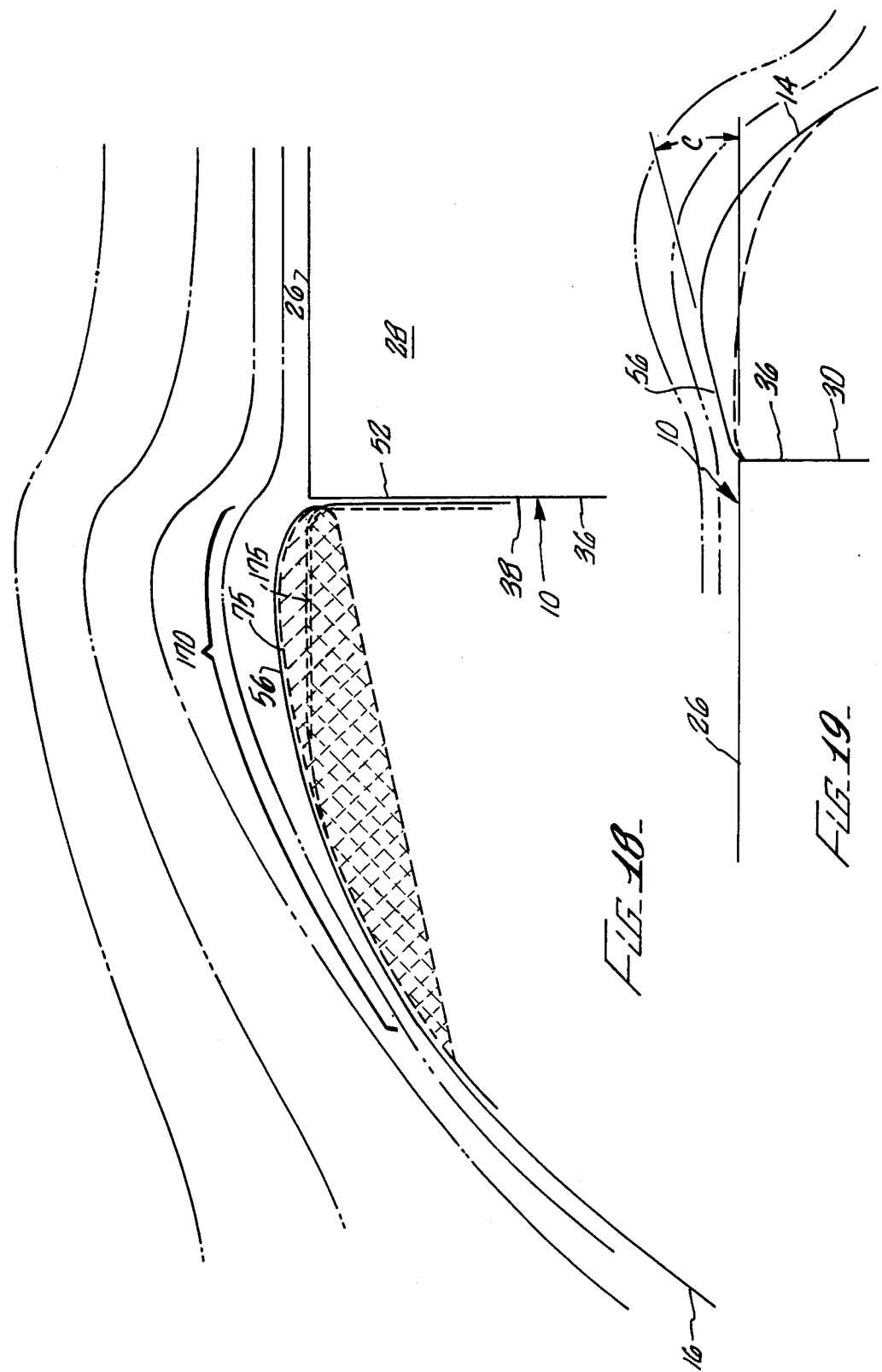

LONG-HAUL VEHICLE STREAMLINE APPARATUS

BACKGROUND

The present invention relates to vehicle drag reduction for improved fuel economy, and more particularly to streamlining of long-haul freight vehicles such as truck-tractor trailer rigs.

The boxy shape of conventional tractor-trailer combinations is dictated by a need to provide a large cargo volume within the maximum allowable dimensions that are fixed by state laws. In the past, the low aerodynamic efficiency of these vehicles was considered of little importance. However, the high cost and uncertain availability of fossil fuels has increasingly focused attention on reducing the aerodynamic drag that accounts for approximately half of the fuel consumption of large trucks in long-haul highway operations.

The potential economic benefit of drag-reduction apparatus can be evaluated based on the fuel that would be saved using the apparatus, the saving being independent of vehicle weight and rolling resistance. For example, a conventional tractor-trailer combination weighing about 25,000 pounds and having a cross-sectional area of 100 square feet and a drag coefficient of 1.0 typically consumes about 20 gallons of diesel fuel per hundred miles at 55 MPH, the fuel costing $16 at a price of $0.80 per gallon. The truck requires about 165 horsepower to overcome about 350 pounds of rolling drag and about 775 pounds of aerodynamic drag. A ten percent reduction in the aerodynamic drag results in a savings of $$\frac{77.5}{550} \times 55 \times \frac{88}{60} = 11.4 \text{ HP}$$

This is equivalent to a savings of about 1.33 gallons or $1.06 per hundred miles, independent of vehicle loading. On a trip of 2,000 miles, the savings is more than $21.

At higher speeds, air drag is greater and there is a corresponding greater reduction in drag for even greater savings. For example, on a 2,000 mile trip at 65 MPH, the aerodynamic drag increases 40% and a ten percent reduction results in a savings of about $30 in fuel costs. The potential savings are $60 per 2000 miles at 65 MPH with a 20% reduction in drag. Further, when the effects of wind are considered, the potential savings are even greater. Moreover, the cost and availability of diesel fuel are subject to change, potentially making aerodynamic drag a critical factor in shipping economy.

Although there are a variety of devices in the prior art for improving the aerodynamics of truck vehicles, these devices exhibit at least some of the following disadvantages:

1. they are ineffective in that they provide little or no drag reduction in actual use;
2. they are awkward to use in that they interfere with normal loading and maintenance operations;
3. they are heavy and bulky, being difficult to install, remove, and store when not in use;
4. they are unsafe in that they interfere with lighting visibility;
5. when permanently installed on a tractor, they increase the drag of dead-heading without a trailer; and
6. they are costly to produce and install.

Thus there is a need for streamlining apparatus for trucks that is effective for significantly reducing fuel consumption, is safe and easy to use and inexpensive to produce and install.

SUMMARY

The present invention is directed to tractor-trailer streamline apparatus that meets this need by providing an aerodynamic balloon for shaping an end member of a trailer body of a tractor-trailer rig. The apparatus includes attachment means on a face perimeter of the end member, and inflatable bag means located against a face of the end member. The bag means has a smooth convex surface facing away from the end member, mounting means for supporting the bag member on the attachment means, means for inflating the bag means, and coupling means connecting the mounting means to the attachment means, the coupling means automatically locking when the bag means is inflated and unlocking when the bag means is deflated.

Preferably the apparatus includes bag means at both front and rear ends of the trailer. This is an important feature of the present invention in that the bag means at both ends of the trailer advantageously cooperate to produce greater drag reduction than the total reduction of aerodynamic drag that is produced by each used separately.

Preferably the attachment means includes a plurality of plate members extending toward the convex surface, and the mounting means includes a plurality of engagement members extending from the bag means and resting on the plate members. Preferably the coupling means includes a hook member on each plate member for preventing a corresponding pin member of each engagement member from moving away more than a predetermined distance from the face when the bag means is inflated. When the bag means is deflated, the coupling means is released by moving the pin members toward the face. When thus released, the engagement members can be lifted from the plate members for easily removing the bag means from the end member.

Preferably the present invention provides clearance for an outwardly opening door hinged at one side of the end member, the plate members located on the side of the end member being hinged for clearing the door when the bag means is deflated and moved away from the face member. Preferably at least the uppermost of the plate members is hinged on an axis substantially displaced from the plane of the face member, forming an elongated hinge for suspending the deflated bag means to one side of the end member for permitting the door to be opened without removing the bag means from the trailer.

Preferably the bag means includes a flexible sheet member having face, side, top and bottom portions, the side portions curving outwardly and longitudinally away from the face portion proximate the sides of the face member, then inwardly and away from the face member to respective side seams that extend on curved paths longitudinally away from opposite top corners inwardly and downwardly, then downwardly and outwardly toward the face portion to corresponding bottom corners of the face member. The top portion curves upwardly and longitudinally away from the face portion, then continues away and downwardly, extending between the side seams; the bottom portion curves longitudinally away and upwardly from the face portion extending between the side seams to the top portion.

Preferably the bag means extends outwardly beyond the perimeter of the face member from about ¾ percent to about 3 percent of the width of the face member for reducing drag-producing turbulence. Preferably the front bag means extends outwardly and forwardly beyond the perimeter of the face member at an angle of from about 10° to about 20° for providing a smooth transition from the outward extensions to the sides of the trailer. Preferably the rear bag means converges rearwardly of the face member a longitudinal distance of at least about half the width of the face area at a slope of not more than about 30° from the longitudinal axis, forming a reduced cross-sectional area of not more than about half the rear face area.

Preferably the bag means includes a pliable belt member for reinforcing the sheet member proximate the mounting means.

Preferably the fill means includes a valve fitting for pressurized air and the blowdown means includes a poppet valve. Preferably the poppet valve is biased closed against air pressure within the bag means for releasing the air in the event of excessive pressure, the valve including a latch for overcoming the biasing when it is desired to deflate the bag means.

Preferably air pressure monitoring means is connected through a conduit to the bag means for indicating normal and abnormal inflation of the bag means, the monitoring means including a check valve between the conduit for preventing escape of air from the bag means in case the indicator becomes disconnected from the bag means. The monitoring means can also be connected to a source of pressurized air for automatically maintaining a desired pressure within the bag means.

Preferably the bag means is translucent for permitting lamps on the trailer to be visible through the bag means.

The present invention is especially effective for significantly reducing aerodynamic drag of tractor-trailer rigs because it improves the shape of both ends of the trailer. The front bag reduces the drag associated with the front well of the trailer while reducing turbulence along the body of the trailer. The reduced turbulence along the body improves the effectiveness of the rear bag by prolonging laminar flow over the converging portions of the rear bag. Thus the combination of the front and rear bags provides a greater benefit than the total benefit of each bag used separately, especially in a crosswind. Moreover, the attachment of the apparatus to the trailer rather than the tractor avoids the increased drag that otherwise would be imposed on the tractor during deadheading without a trailer.

The present invention is easy to use in that the inflatable bags are light and easy to connect to the trailer. They can be conveniently inflated by pressurized air from the truck's utility air system, a dedicated source of pressurized air, or by service station air. During loading and unloading operations, the rear bag can be easily deflated, partially uncoupled from the trailer, and swung to one side on the elongated storage hinge.

DRAWINGS

These and other features, aspects, and advantages of the present invention will become better understood with reference to the following description, appended claims, and accompanying drawings where:

FIG. 5 is a fragmentary left front elevational perspective view of the trailer of FIG. 1 in use connected to truck tractor;

FIG. 6 is a fragmentary left rear elevational perspective view of the trailer of FIG. 1;

FIG. 6a is a fragmentary sectional view of the apparatus of FIG. 1 within region 6a of FIG. 6

FIG. 8 is a fragmentary plan sectional view of the apparatus of FIG. 1 taken on line 8—8 in FIG. 6;

FIG. 9 is a fragmentary elevational view of the apparatus of FIG. 1 taken along line 9—9 in FIG. 8;

FIG. 15 is a schematic plan view showing crosswind turbulence generated by a conventional vehicle;

FIG. 16 is a schematic plan view showing crosswind turbulence reduced according to the present invention;

FIG. 17 is an oblique elevational perspective view of a pressure monitoring unit of the apparatus of FIG. 1, the unit schematically shown connected therein;

FIG. 18 is a fragmentary cross-sectional elevational view of the apparatus of FIG. 1 taken on line 18—18 in FIG. 6; and FIG. 19 is a fragmentary cross-sectional elevational view of the apparatus of FIG. 1 taken on line 19—19 in FIG. 5.

DESCRIPTION

Figure 1:
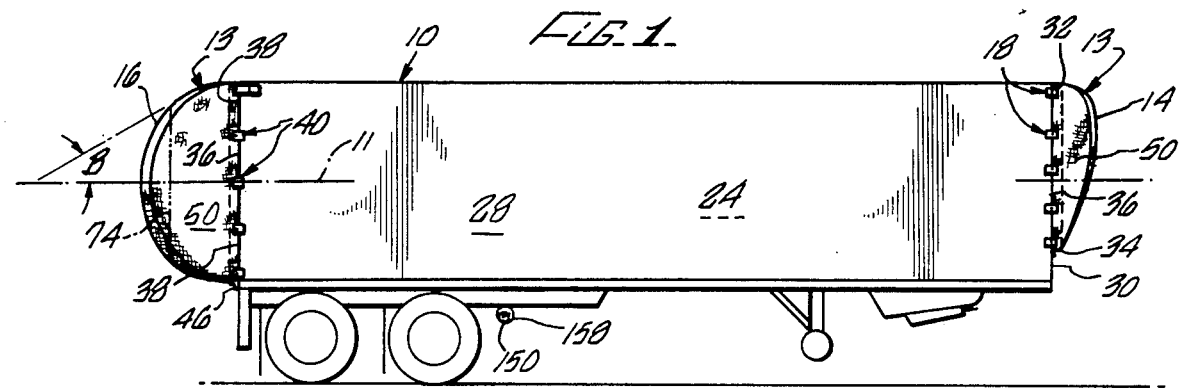
FIG. 1 is a side elevational view of a truck trailer having front and rear streamlining apparatus according to the present invention.

The present invention is directed to aerodynamic drag-reducing apparatus for use in large long-haul vehicles such as trailer trucks, piggy back trains, recreational vehicles, vans and the like. With reference to FIGS. 1-6, a truck trailer 10 for use with a tractor 12 is equipped with a pair of removable, inflatable, streamline bag assemblies 13, designated front bag 14 and rear bag 16. The front bag 14 is fastened against a front wall 30 of the trailer 10 by a spaced plurality of couplings 18, a hook plate 20 of each coupling 18 being affixed to the trailer 10 by a screw fastener 21, the hook plate 20 releasably engaging a corresponding pin member 22 of the coupling 18, the pin member 22 being affixed to the front bag 14.

The hook plates 20 for the front bag 14 are spaced along a left wall 24, a top wall 26, a right wall 28, and a front wall 30, a hook portion 32 of hook plates 20 extending forwardly of the front wall 30. The complement of the hook plates 20 on the front wall 30, designated angle plates 34, are spaced horizontally across a lower portion of the front wall 30. The hook plates 20 thus define a rectangular face area or region 36 of the front wall 30 above the angle plates 34. When the front bag 14 is inflated as described below, the front bag 14 forms a smooth aerodynamic shape in space between the trailer 10 and the tractor 12 for reducing air turbulence and associated drag while the trailer 10 is moving along. As shown in the drawings, the angle plates 34 are located above the bottom of the front wall 30 for access to the rear of the tractor 12, and for the free passage of cooling air.

Figure 7:
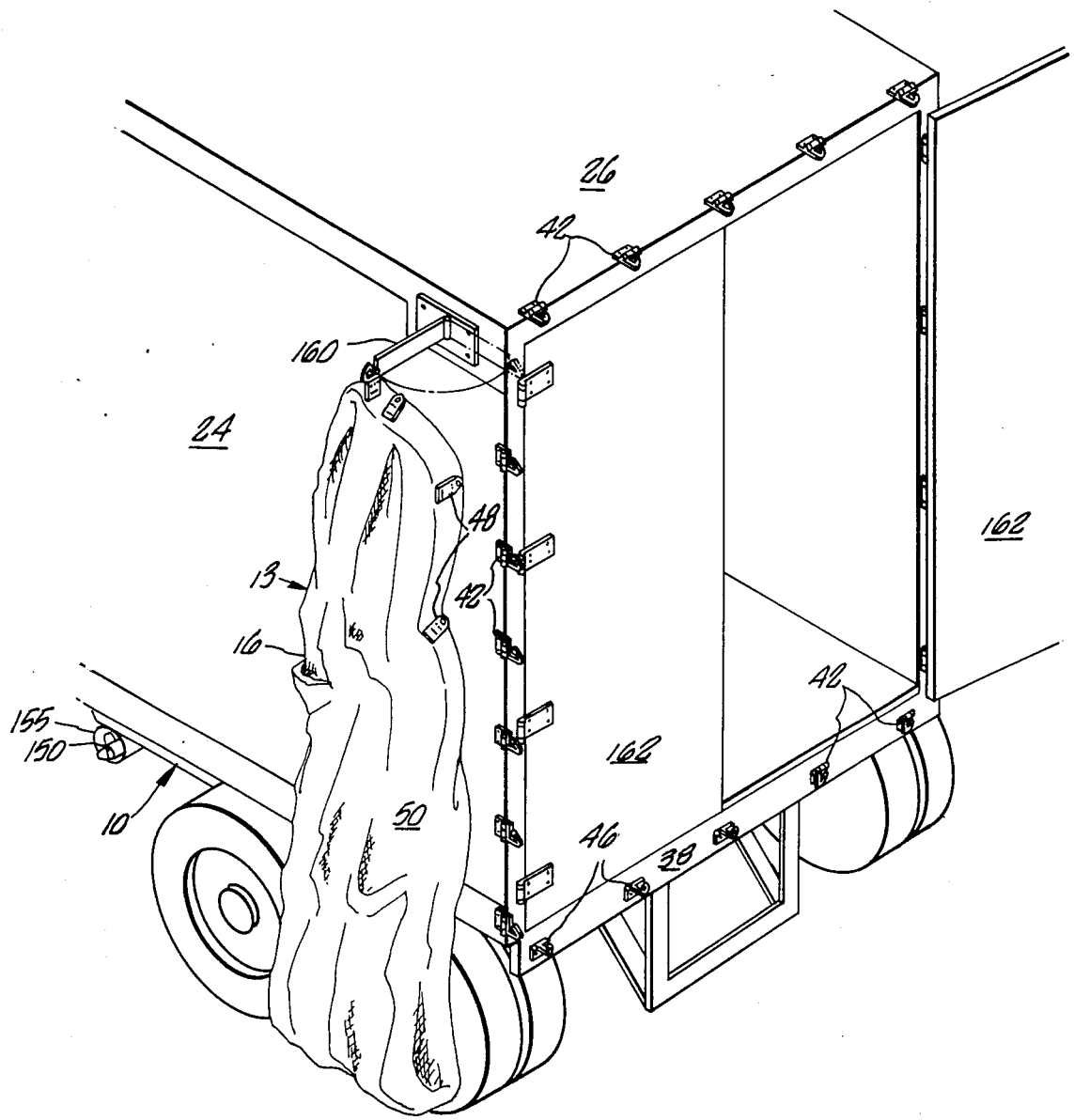
FIG. 7 is a fragmentary view as in FIG. 6 showing the rear apparatus temporarily stored to one side for rear access to the trailer.
Figure 10:
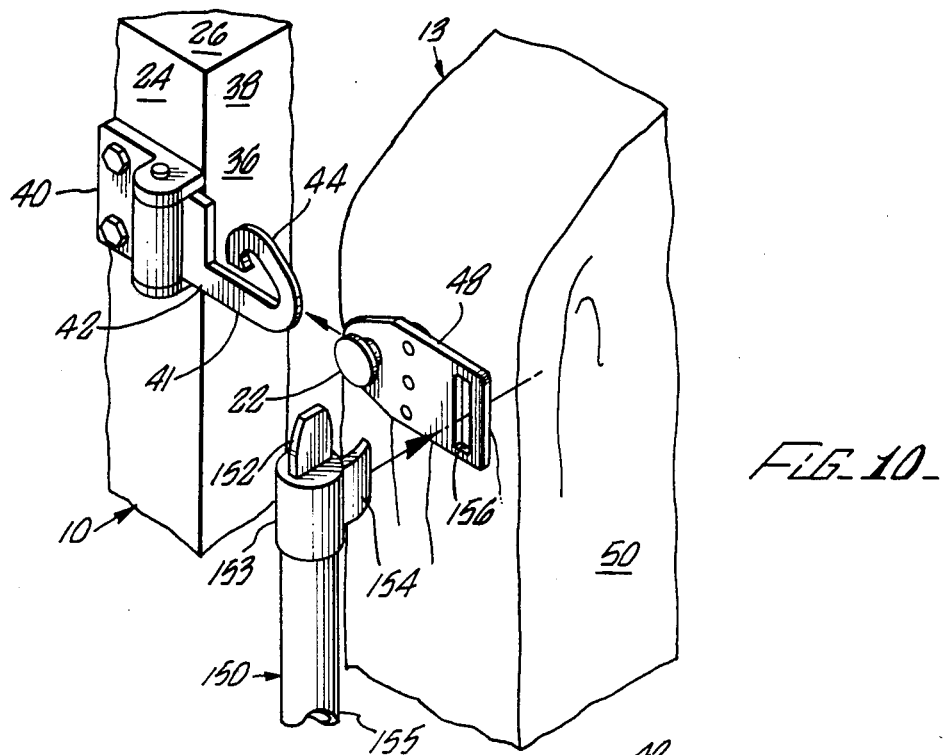
FIG. 10 is a fragmentary left rear perspective view of the apparatus of FIG. 1 showing use of a mounting pole for attaching the apparatus to the left side of the trailer.
Figure 11:
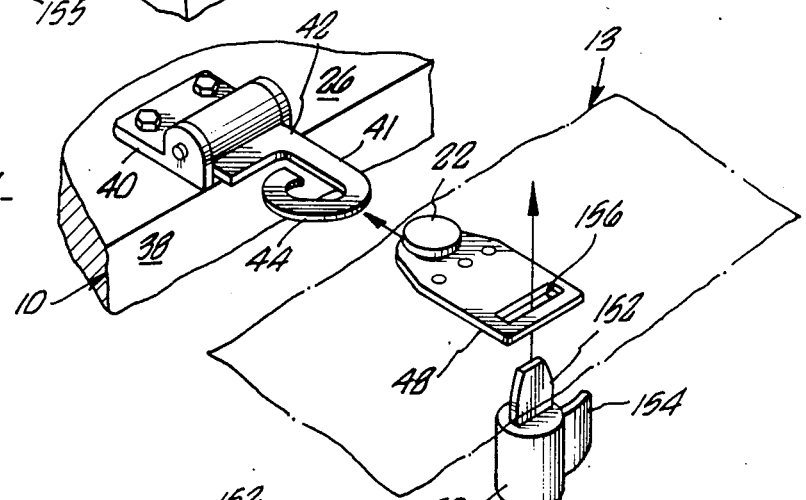
FIG. 11 is a fragmentary left rear perspective view of the apparatus of FIG. 1 showing use of the mounting pole for attaching the apparatus to the top of the trailer.
Figure 12:
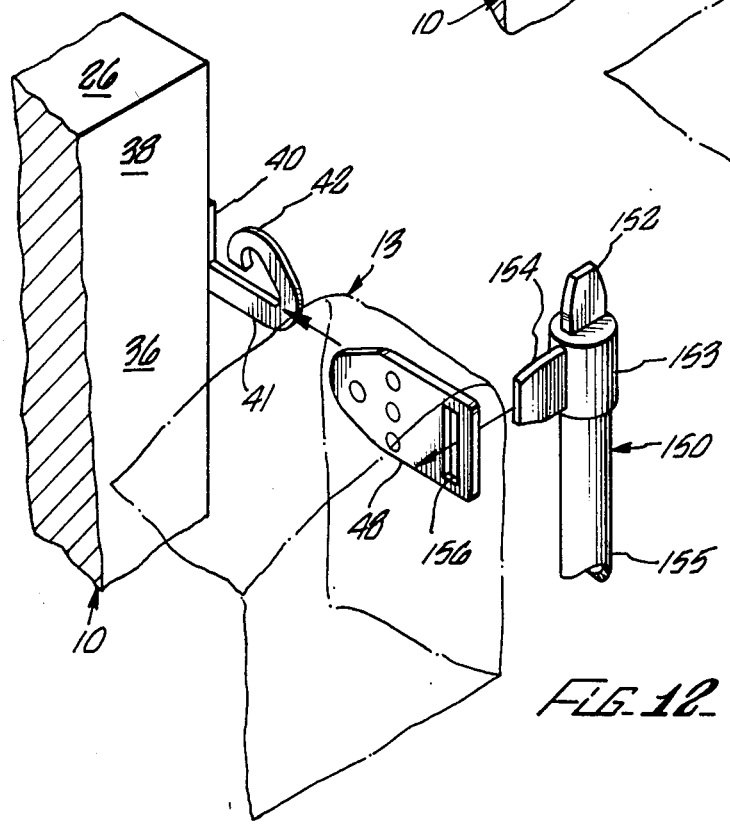
FIG. 12 is a fragmentary left rear perspective view of the apparatus of FIG. 1 showing use of the mounting pole for attaching the apparatus to the right side of the trailer.

With further reference to FIGS. 7-9, the rear bag 16 is similarly fastened against a rear wall 38 of the trailer 10 by a plurality of hinge couplings 40, each hinge coupling 40 having a hinge hook 42 affixed to the trailer 10, and releasably engaging a corresponding pin member 22 affixed to the rear bag 16. The trailer 10 has a longitudinal or travel axis 11 that is perpendicular to the front wall 30 and the rear wall 38. Typically, the trailer 10 has a width W of about 8 feet, and measures from 12 to 15 feet high and from 25 to 40 feet long.

The hinge hooks 42 are spaced along the left wall 24, the top wall 26, the right wall 28 and the rear wall 38, a hook portion 44 of each hinge hook 42 extending rearwardly of the rear wall 38. The complement of the hinge hooks 42 on the rear wall 38, designated angle hooks 46, are spaced horizontally across the bottom of the rear wall 38. The hinge couplings 40 are thus spaced around the perimeter of the rear wall 38, the rear wall 38 forming a face region 36 for the rear bag 16.

Each pin member 22 is rigidly fastened to a corresponding coupling plate 48, the coupling plate 48 being sealingly riveted to the rear bag 16 by a plurality of rivets 49. The pin member 22 rests on a horizontally oriented supporting rail 41 of the hook portion 44 of the hinge hook 42, the hook portion 44 being confined between the coupling plate 48 and a head member 23 of the pin 22. A C-shaped member 43 extends upwardly from the supporting rail 41 for preventing the pin 22 from moving away from the rear wall 38 when the bag assembly 13 is inflated. From the top of the C-shaped member a sloping rail 45 extends upwardly away from the supporting rail 41 and a J-shaped member 47, extending downwardly from the sloping rail 45, is spaced apart from the supporting rail 41.

The J-shaped member 47 is spaced above the supporting rail 41 for permitting the pin member 22 to be lowered onto the supporting rail 41, then moved under the J-shaped member 47 away from the rear wall 38 into engagement with the C-shaped member 43. The J-shaped member 47 prevents inadvertent disengagement of the pin member 22 from the hook portion 44 when the pin member 22 is simultaneously moved away from the supporting rail 41 and the C-shaped member 43. Thus when the bag assembly 13 is deflated and manipulated for disengaging selected ones of the pin members 22 from the associated hook portions 44, the other pin members 22 are retained on their respective hook portions 44.

As shown in FIGS. 8 and 9, the hinge hooks 42 are preferably provided with a detent ball 76 for holding the hook portion 44 in a desired orientation relative to the trailer 10. The detent ball 76, retained in a stationary member 78 of the hinge hook 42, is biased against a cylindrical member 80 of the hook portion by a spring 82, the cylindrical member 80 being pivotably located on its axis by a hinge pin 84. The cylindrical member 80 includes at least one detent depression 86 for engaging the detent ball and holding the hook portion 44 in the desired orientation. The depression 86 holds the hook portion projecting toward the rear bag 16 for facilitating attachment of the rear bag 16 to the trailer 10. A detent depression 87 is located on the cylindrical member 80 for holding the hook portion 44 perpendicular to the stationary member 78 so that the hinge hook 42 can additionally function as the angle plate 34 for the front bag 14 and the angle hook 46 for the rear bag 16. It should also be understood that the hinge hooks 42 can replace the remainder of the hook plates 20 for supporting the front bag 14, thereby reducing inventory costs. A further detent depression 88 is located on the cylindrical member 80 for holding the hook portion 44 in a folded position against the stationary member 78 when the bag assembly 13 is not being used.

As shown in FIGS. 1, 6 and 7, the uppermost of the hinge hooks, designated extension hooks 160 on opposite sides of the trailer 10, are elongated for pivoting the respective hook portions 44 substantially forwardly of the rear wall 38. Thus when the rear bag 16 is deflated, it can be disconnected from the other hinge hooks 42 and swung to one side of the trailer 10 for access to a rear door 162 of the trailer 10.

As shown in FIGS. 1-8, the bag assemblies 13 are each fabricated from a light flexible airtight sheet member 50 made from a plastic material such as polyethylene, or a canvas or other fabric that is coated or otherwise treated for preventing air loss. The sheet member 50 includes a face portion 52 for bearing against the face region 36, the face portion 52 substantially covering the face region 36. The sheet member 50 extends outwardly from the travel axis 11 and longitudinally away from the face region 36, forming a pair of side portions 54, a top portion 56, and a bottom portion 58. The side portions 54 and the top portion 56 of the sheet member 50 curve longitudinally away from the face region 36 as shown in FIGS. 8, 18 and 19.

With particular reference to FIG. 6, the top portion 56 of the rear bag 16 joins the side portions 54 along a pair of side seams 60. The bottom portion 58 of the sheet member 50 extends from the face region 36 longitudinally away from the face region 36, curving upwardly and joining the top portion 56 at a connecting seam 62, the bottom portion 58 also joining the side portions 54 along the side seams 60. The side seams 60 each extend from a top corner 64 of the face region 36 longitudinally away from the face region 36, each curving inwardly and downwardly to a seam point 66, then curving downwardly and outwardly to a respective bottom corner 68 for producing a smooth aerodynamic shape of the bag assembly 13. The distance between the seam points 66, designated D in FIG. 4, is preferably from about one-third to about two-thirds of the width W of the trailer 10, being more preferably about half of the width W.

As shown in FIG. 6a, the side seams 60 are reinforced with a strand 70 of high-strength material having low tensile deformation for strengthening and shaping the bag assembly 13. An edge member 72 of the side portion 54 is folded over the strand 70. The top portion 56 is folded between the side portion 54 and the edge member 72 and sealingly secured therebetween by welding, bonding, stitching, or other suitable means. Thus the strand 70 is confined within and in line with the curved side seam 60 for preventing axial strain of the side seam 60. The high-strength material for the strand 70 can be a stainless steel wire or an aramid polyamide such as Kalavar. Kalavar is a trademark of E. I. DuPont de Nemours & Co., Inc., Wilmington, Del.

Figure 4:
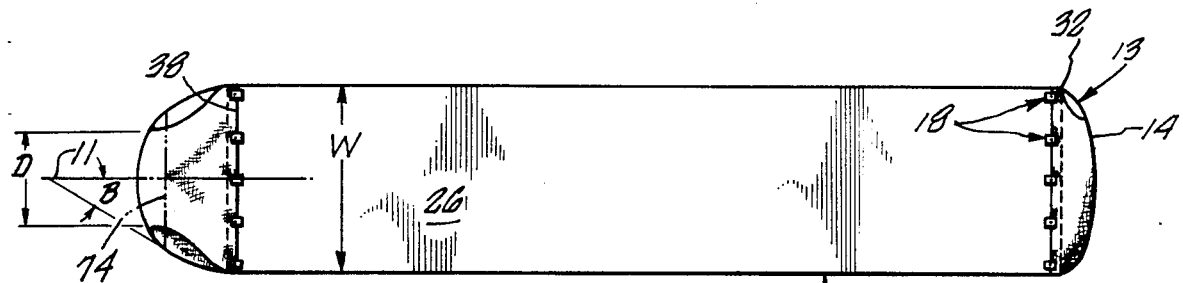
FIG. 4 is plan view of the trailer of FIG. 1.
Figure 2:
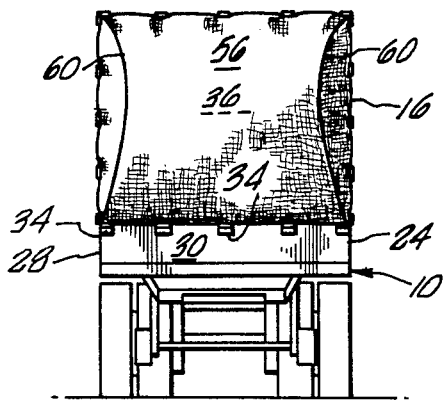
FIG. 2 is front elevational view of the trailer of FIG. 1.
Figure 3:
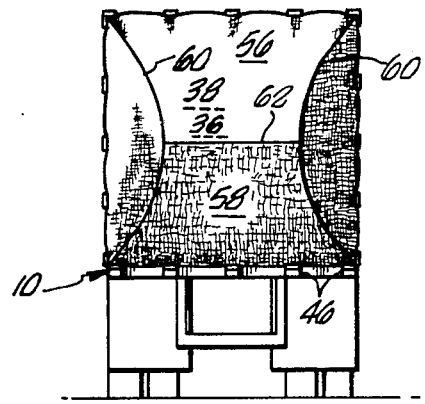
FIG. 3 is a rear elevational view of the trailer of FIG. 1.

In a preferred version of the present invention the rear bag 16 converges vertically and horizontally at a slope angle B in FIGS. 1 and 4 of not more than about 30° rearwardly to a reduced cross-sectional area in a plane 74 parallel to the rear face region 36, the plane 74 being displaced rearwardly from the face region 36 a distance of about half the width of the face region 36, the reduced cross-sectional area being not more than about half the face area. By limiting the slope angle B to not more than about 30°, laminar or quasi-laminar flow is maintained over the rear bag 16 rearwardly to the location of the reduced cross-sectional area at the plane 74, significantly reducing the drag associated with the rear of the trailer by a factor of approximately the ratio of the reduced cross-sectional area to the face area, a ratio of one-half or less.

As shown in FIG. 18, the outward extension of the rear bag 16 beyond the trailer 10 is shaped like the top surface of a first wing-shaped area 75 between the hinge couplings 40 (line 18-18A in FIG. 6) and a second wing-shaped area 175 at the hinge couplings 40 (line 18-18B in FIG. 6). The combination of the wing-shaped areas 75 and 175 speeds up the flow of air over the rear bag 16, producing a low-pressure region 170 that advantageously pulls the sheet member outwardly from the travel axis 11, reducing the air pressure required for inflating the rear bag 16.

The construction of the front bag 14 generally follows that of the rear bag 16, except that the top portion 56 extends downwardly and rearwardly to proximate the face region 36 and the bottom corners 68, as shown in FIG. 5. Also, with further reference to FIG. 19, the front bag 14 extends outwardly and forwardly of the trailer 10 at an angle C of from about 10° to about 20° for providing a smooth aerodynamic transition from the outwardly extending contour of the front bag 14 to the top wall 26 of the trailer 10.

A belt member 144 reinforces the sheet member 50 of each bag assembly 13, the belt member 144 including a plurality of overlapping layers 146 of a flexible material, the layers 146 being sewn or bonded together for forming a semi-rigid support for the sheet member 50 between the coupling plates 48 and proximate the perimeter of the face region 36.

Figure 8A:
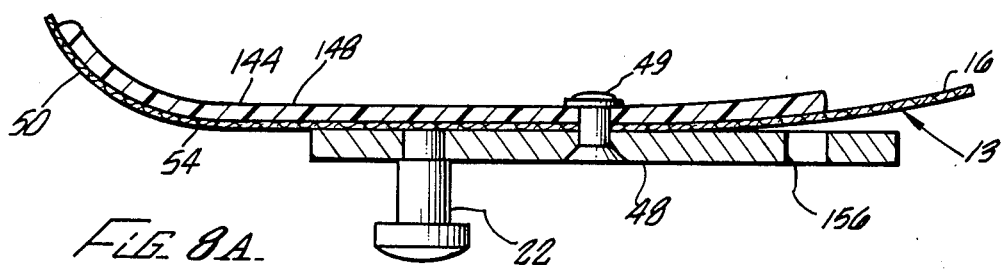
FIG. 8a is a fragmentary view showing an alternative configuration within region 8a of FIG. 8.

Alternatively, the belt member 144 is flexible channel-shaped molded plastic member 148 as shown in FIG. 8a, the plastic member 148 contacting the inside of the sheet member 50.

The rear bag 16 extends outwardly slightly beyond the face area 36 for preventing the introduction of turbulence in the plane of the rear face area 36. The amount of the outward extension is from about ¾ inch to about 3 inches or from about 0.8 to about 3 percent of the width of the trailer 10.

Figures 13, 14:
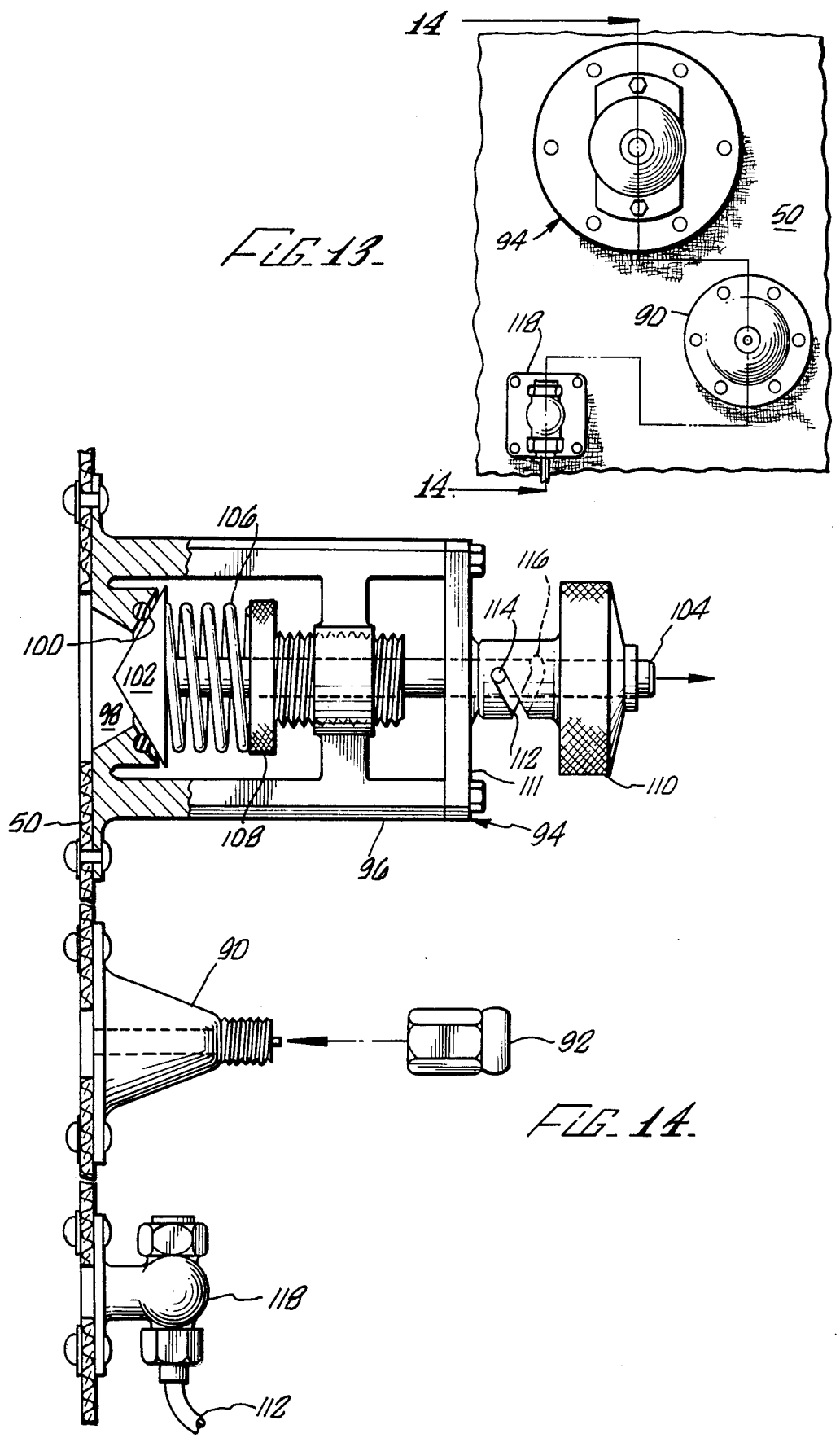
FIG. 13 is a fragmentary elevational view of the trailer of FIG. 1 within region 13 of FIG. 6.
FIG. 14 is a fragmentary sectional elevational view of the trailer of FIG. 1 taken along line 14—14 in FIG. 13.

With further reference to FIGS. 13, 14, and 17, each bag assembly 13 includes a valve stem assembly 90 sealingly mounted to the sheet member 50 for admitting pressurized air for inflating the bag assembly 13, the valve stem assembly 90, of conventional construction for connection to tire inflation apparatus, is provided with a protective cap 92. It should be understood that appropriate sources of pressurized air for inflating the bag assembly 13 are the truck's utility air system, a dedicated source such as an air pump, a spare tire, as well as service station or shop air.

The bag assembly 13 is also equipped with a blowdown assembly 94 for deflating the bag assembly 13. The blowdown assembly 94 includes a blowdown housing 96, sealingly mounted to the sheet member 50, the housing 96 having a port 98 opening into the bag assembly 13. The port 98 extends to an outwardly facing seat member 100 for a poppet valve 102, a stem 104 of the poppet valve 102 slidingly engaging the housing 96 for opening and closing against the seat member 100.

The poppet valve 102 is biased closed toward the seat a member, against air pressure within the bag assembly 13, by a valve spring 106. The valve spring 106 is adjustably supported concentric with the stem 104 by a spring nut 108, the spring nut 108 threadingly engaging the housing 96 for adjusting the bias of the poppet valve 102. If air pressure within the bag assembly exceeds a desired maximum pressure, the poppet valve 102 opens outwardly, compressing the valve spring, thereby permitting air to escape from the bag assembly 13. The seat member 100 is an O-ring made from resilient material such as neoprene for sealing the poppet valve 102 against the housing 96.

A release knob 110 slidingly engages the stem 104, the knob 110 resting against a plate member 111 of the housing 96, the knob 110 having a spiral slot 112 therein. A pin 114, laterally protruding the stem 104, engages the slot 112 for moving the poppet valve 102 away from the seat member 100 in response to rotation of the knob 110 relative to the stem 104. The slot 112 includes a detent portion 116 for holding the poppet valve 102 in an open position against the valve spring 106.

A check valve 118 is also sealingly mounted to the sheet member for communicating with a monitor unit 120. A conduit 122 connects the check valve 118 to the monitor unit 120, the conduit being formed of a flexible material such as a vinyl resin. A suitable material for the conduit 122 is a chloride acetate copolymer such as Tygon. Tygon is a trademark of U.S. Stoneware Co., Akron, Ohio. The conduit 122 includes a quick release T-fitting 124 for connecting respective check valves 118 for the front bag 14 and the rear bag 16 to the monitor unit 120, and for permitting the monitor unit 120 to be disconnected from the trailer 10. The monitor unit 120 includes a monitor housing 126 having bracket means 128 for mounting to the tractor 12 in a convenient location. For clarity, the monitor unit 120 is shown in FIG. 5 mounted externally on the tractor 12; however, the location of the monitor unit 120 is not critical and can be either internal or external to the tractor 12, or even on the trailer 10.

The monitor unit 120 also includes a pressure gage 130 and pressure transducer 131 connected to the conduit 122, a low pressure warning light 132 and an associated lamp test and power switch 134, a potentiometer 136 for adjusting the pressure transducer 131, and an alarm horn 134, each mounted to the monitor housing 126.

The transducer 131, in response to the potentiometer 136, connects a voltage source 140 of the truck to the warning light 132 and the horn 138 for visually and audibly indicating an abnormal low-pressure condition of the bag assemblies 13.

With further reference to FIGS. 7 and 10-12, the bag assembly 13 of the present invention is easily connected to the trailer 10 using a mounting pole 150 for lifting the coupling plate 48 of the bag assembly 13 into engagement with the hinge hooks 42 on the trailer 10. The mounting pole 150 has an end tab 152 extending upwardly from a top end 153 of the mounting pole 150, and a trapezoidal side tab 154 extending laterally and upwardly from the top end 153. The coupling plates 148 each have a tab slot 156 for engaging the end tab 152 or the side tab 154 of the mounting pole 150. The mounting pole 150 preferably includes a lightweight tubular pole member 155, the mounting pole 150 comprising a light structural alloy such as aluminum for ease of handling. When not in use, the mounting pole 150 is storable in a tubular rack member 158 of the trailer 10.

The side tab 154 of the mounting pole 150 is sequentially engaged with the tab slot 156 of successive coupling plates 48, the corresponding pin members 22 being lifted and manipulated onto the supporting rail 41 of the hinge hooks 42 at on the left wall 24 and the right wall 28 of the trailer 10. Similarly, the end tab 152 is sequentially engaged with the tab slot 156 of the coupling plates 48 for engaging the respective pin members 22 with the hinge hooks 42 on the top wall 26 of the trailer 10.

With reference to FIGS. 15 and 16, the apparatus of the present invention greatly reduces the aerodynamic drag of the trailer 10, particularly in a crosswind. As shown in FIG. 15, when the trailer 10 is not equipped with the present invention, a crosswind at a commonly encountered relative heading of 15° to the left from the travel axis 11 produces a large high pressure region 178 in front of the front wall 30 and a large volume of turbulent flow in a negative pressure region of the shaded area 180 extending along the right wall 28 and behind the rear wall 38 of the trailer 10.

In contrast, the apparatus of the present invention produces a small high pressure region 182 in front of the front bag 14 and a small turbulent region 184 behind the rear bag 16. This is because the front bag directs the air flow from in front of the trailer 10 smoothly to along the sides of the trailer 10. The relatively smooth flow along both sides of of the trailer 10 continues over the rear bag 16 with minimal separation until the cross-sectional area of the rear bag 16 is significantly less than that of the rear wall 38.

Although the present invention has been described in considerable detail with reference to certain preferred versions thereof, other versions are possible. For example, the bag assemblies 13 can be illuminated from the inside or from a light source at the face area 36. The sheet member 50 can have a translucent orange coloring for high visibility and safety, especially at night. Also, the sheet member 50 can include artwork for illuminated advertising that would promote the trucking company or generate revenue. Therefore, the spirit and scope of the appended claims should not necessarily be limited to the description of the preferred versions contained herein.

What is claimed is:

1. Apparatus for streamlining a vehicle body having at least one end member having a face area comprising a substantially plane surface perpendicular to a travel axis of the vehicle, the apparatus comprising:

(a) attachment means ona perimeter of the face area of the end member of the vehicle, the attachment means comprising a plurality of plate members spaced along the perimeter of the face area;

(b) inflatable bag means located against the face area, the bag means having a smooth aerodynamic convex portion facing away from the face area, the bag means comprising:

(i) mounting means for supporting the bag means by the attachment means, the plate members of the attachment means extending toward the convex portion of the bag means the mounting means comprising a plurality of engagement members extending from the convex portion of the bag means, the engagement members being supported by the corresponding plate members;

(ii) fill means for admitting a pressurized gas into the bag means; and (iii) blowdown means for deflating the bag means; and (c) coupling means for connecting the mounting means to the attachment means, the coupling means being locked when the bag means is inflated and releasable when the bag means is deflated, the coupling means comprising a hook member on each plate member and a pin member on each engagement member, the hook member preventing the pin member from moving away from the face area beyond a predetermined distance when the bag means is inflated, the hook member releasing the pin member when the bag means is deflated and the pin member is moved toward the face area.

2. The apparatus of claim 1 wherein the hook member comprises a horizontally extending rail portion joining the lower leg of an upwardly extending C-shaped member, the pin member being retained within the C-shaped member when the bag is inflated.

3. The apparatus of claim 2 wherein the hook member further comprises an upwardly slanting rail portion joined to the upper leg of the C-shaped member, the slanting rail portion extending over a portion of the horizontally extending rail portion and joining a downwardly extending J-shaped member, the lowermost part of the J-shaped member being spaced above the horizontally extending rail portion for permitting the pin member to be lowered onto the horizontally extending rail member and passed beneath the J-shaped member into engagement with the C-shaped member, the J-shaped member preventing inadvertent disengagement of the pin member from the hook member when the pin member is simultaneously lifted from the horizontally extending rail portion and moved away from the C-shaped member.

4. The apparatus of claim 1 wherein the end member includes a door hinged at one side of the end member, the door opening outwardly, and at least the plate members that are located on the side of the end member are hinged from the vehicle for permitting the door to be opened when the bag means is deflated and moved away from the face area.

5. The apparatus of claim 4 wherein at least the uppermost of the hinged plate members at the side of the end member is hinged on an axis located proximate the vehicle body and substantially displaced from the plane of the face area for suspending the bag means in a deflated condition at the side of the vehicle while permitting the door to be opened.

6. The apparatus of claim 1 wherein the bag means comprises a flexible sheet material joined at a plurality of curved seams.

7. The apparatus of claim 6 wherein at least one of the seams is reinforced by a strand selected from a group consisting of an aramid polyamide and corrosion resistant steel.

8. The apparatus of claim 1 wherein the bag means comprises:
 (a) a flexible sheet member;
 (b) a belt member for shaping and reinforcing the sheet member proximate the perimetr of the face area, the belt member being fastened to the engagement members.

9. The apparatus of claim 8 wherein the belt member comprises overlapping layers of a fabric material.

10. Apparatus for streamlining a vehicle body having at least one end member having a face area comprising a substantially plane surface perpendicular to a travel axis of the vehicle, the apparatus comprising:
 (a) attachment means on a perimeter of the face area of the end member of the vehicle;
 (b) inflatable bag means located against the face area, the bag means having a smooth aerodynamic convex portion facing away from the face area, the bag means comprising:
  (i) a flexible sheet material joined at a plurality of curved seams, comprising face side, top, and bottom sheet portions, the face sheet portion substantially covering the face area, the side portions curving outwardly and longitudinally away from proximate the sides of the face area at a radius of curvature of up to approximately one tenth of the width of the face area, then curving on each side inwardly and away from the face area to a respective side seam, each side seam extending from proximate a top corner of the face area on a curved path longitudinally away from the face area, inwardly and downwardly to a seam point located vertically between the top corner and a corresponding bottom corner of the face area below the top corner, away from the face area a distance of from one-third to two-thirds the width of the face area, and inwardly from one-fifth to one-third the width of the face area, the seam extending downwardly, outwardly, and toward the face area from the seam point to proximate the bottom corner, the top sheet portion curving upwardly and longitudinally away from proximate the top of the face area at a radius of curvature of up to about one tenth of the width of the face area and extending longitudinally away from the face area and downwardly along the side seams to the seam points, the bottom portion extending from proximate the bottom of the face area along the side seams to the seam points and joining the top sheet portion along a line connecting the seam points, the line extending longitudinally away from the face area beyond the side seam points by from about 1/16 to about ¼ of the width of the face area;
  (ii) mounting means for supporting the bag means by the attachment means;
  (iii) fill means for admitting a pressurized gas into the bag means; and
  (iv) blowdown means for deflating the bag means; and
 (c) coupling means for connecting the mounting means to the attachment means, the coupling means being locked when the bag means is inflated and releasable when the bag means is deflated.

11. The apparatus of claim 10 wherein the bag means comprises translucent material for diffucing light from a source proximate to the face area of the wall for enhancing visibility of the trailer.

12. The apparatus of claim 10 wherein at least one of the side and top sheet portions of the bag means extends outwardly beyond the perimeter of the face area by a distance of from about 0.8 percent to about 3 percent of the width of the face area and the curvature of that sheet portion longitudinally away from the face area begins along the perimeter of the face area.

13. Apparatus for streamlining a vehicle body having at least one end member having a face area comprising a substantially plane surface perpendicular to a travel axis of the vehicle, the apparatus comprising:
 (a) attachment means on a perimeter of the face area of the end member of the vehicle, the attachment means comprising a plurality of plate members spaced along the perimeter of the face area, the plate members extending toward the convex portion of the bag means; and
 (b) inflatable bag means located against the face area, the bag means having a smooth aerodynamic convex portion facing away from the face area, the bag means comprising
  (i) a flexible sheet member;
  (ii) a belt member for shaping and reinforcing the sheet member proximate the perimeter of the face area, the belt member being fastened to the engagement members, the belt member comprising a molded plastic strip having a convex surface for shaping the inside of the sheet member proximate the perimeter of the face area;
  (iii) mounting means for supporting the bag means by the attachment means, the mounting means comprising a plurality of engagment members extending from the convex portion of the bag means, the engagement members being supported by the corresponding plate members;
  (iv) fill means for admitting a pressurized gas into the bag means; and
  (v) blowdown means for deflating the bag means; and
 (c) coupling means for connecting the mounting means to the attachment means, the coupling means being locked when the bag means is inflated and releasable when the bag means is deflated.

14. The apparatus of claim 1 wherein the end member is a rear end member having a rear face area, the bag means extending and converging rearwardly of the rear face area, the bag means having a reduced cross-sectional area parallel to the rear face area of not more than about 60% of the rear face area in a plane displaced rearwardly therefrom, the bag means having a converging slope of not more than about 30° vertically and horizontally from the travel axis between the plane of the rear face area and the plane of the reduced cross-sectional area.

15. The apparatus of claim 1 wherein the vehicle body includes front and rear end members having corresponding front and rear face areas, the apparatus comprising corresponding front and rear attachment means and inflatable bag means, the rear bag means extending and converging rearwardly of the rear face area, the bag means having a reduced cross-sectional area parallel to the rear face area of not more than about 60% of the rear face area in a plane displaced rearwardly therefrom, the bag means having a converging slope of not more than about 30° vertically and horizontally from the travel axis between the plane of the rear face area and the plane of the reduced cross-sectional area.

16. The apparatus of claim 1 wherein the fill means comprises a valve stem fitting for pressurized air and the blowdown means comprises a poppet valve.

17. The apparatus of claim 16 wherein the poppet valve opens outwardly, the poppet valve further comprising:
  (a) biasing means for holding the poppet valve closed against air pressure within the bag means; and
  (b) means for latching the poppet valve open against the biasing means.

18. The apparatus of claim 1 further comprising means for monitoring air pressure within the bag means, the monitoring means comprising:
  (a) pressure sensing means;
  (b) a conduit for connecting the sensing means to the bag means; and
  (c) check valve means for hydraulically isolating the conduit from the bag means when air flows from the bag means into the conduit at more than a predetermined rate of flow.

19. Apparatus for streamlining a vehicle body having at least one end member having a face area comprising a substantially plane surface perpendicular to a travel axis of the vehicle, the apparatus comprising:
  (a) attachment means on a perimeter of the face area of the end member of the vehicle, the attachment means comprising a plurality of plate members spaced along the perimeter of the face area, the plate members extending toward the convex portion of the bag means;
  (b) inflatable bag means located against the face area, the bag means having a smooth aerodynamic convex portion facing away from the face area, the bag means comprising:
    (i) mounting means for supporting the bag means by the attachment means, the mounting means comprising a plurality of engagement members extending from the convex portion of the bag means, the engagement members being supported by the corresponding plate members;
    (ii) fill means for admitting a pressurized gas into the bag means; and
    (iii) blowdown means for deflating the bag means; and
  (c) coupling means for connecting the mounting means to the attachment means, the coupling means being locked when the bag means is inflated and releasable when the bag means is deflated, the coupling means comprising:
    (i) a pin member on each engagement member;
    (ii) a hook member on each plate member, the hook member preventing the pin member from moving away from the face area beyond a predetermined distance when the bag means is inflated, the hook member releasing the pin member when the bag means is deflated and the pin member is moved toward the face area, the hook member comprising a horizontally extending rail portion joining the lower leg of an upwardly extending C-shaped member, an upwardly slanting rail portion joined to the upper leg of the C-shaped member, the slanting rail portion extending over a portion of the horizontally extending rail portion and joining a downwardly extending J-shaped member, the lowermost part of the J-shaped member being spaced above the horizontally extending rail portion for permitting the pin member to be lowered onto the horizontally extending rail member and passed beneath the J-shaped member into engagement with the C-shaped member,
wherein the pin member is retained within the C-shaped member when the bag is inflated, and the J-shaped member prevents inadvertent disengagement of the pin member from the hook member when the pin member is simultaneously lifted from the horizontally extending rail portion and moved away from the C-shaped member.

20. Apparatus for streamlining a vehicle body having front and rear end members, each end member having a face area comprising a substantially plane surface perpendicular to a travel axis of the vehicle, the apparatus comprising:
  (a) attachment means on a perimeter of the face area of each end member of the vehicle;
  (b) front and rear inflatable bag means located against the corresponding face areas, the bag means having a smooth aerodynamic convex portion facing away from the respective face area, each bag means comprising:
    (i) a flexible sheet material joined at a plurality of curved seams and having face side, top, and bottom sheet portions, the face sheet portion substantially covering the face area, the side portions curving outwardly and longitudinally away from proximate the sides of the face area at a radius of curvature of up to approximately one tenth of the width of the face area, then curving on each side inwardly and away from the face area to a respective side seam, each side seam extending from proximate a top corner of the face area on a curved path longitudinally away from the face area, inwardly and downwardly to a seam point located vertically between the top corner and a corresponding bottom corner of the face area below the top corner, away from the face area a distance of from one-third to two-thirds the width of the face area, and inwardly from one-fifth to one-third the width of the face area, the seam extending downwardly, outwardly, and toward the face area from the seam point to proximate the bottom corner, the top sheet portion curving upwardly and longitudinally away from proximate the tip of the face area at a radius of curvature of up to about one tenth of the width of the face area and extending longitudinally away from the face area and downwardly along the side seams to the seam points, the bottom portion extending from proximate the bottom of the face area along the side seams to the seam points and joining the top sheet portion along a line connecting the seam points, the line extending longitudinally away from the face area beyond the side seam points by from about 1/16 to about ¼ of the width of the face area;
    (ii) mounting means for supporting the bag means by the attachment means;
    (iii) fill means for admitting a pressurized gas into the bag means; and
    (iv) blowdown means for deflating the bag means; and
  (c) coupling means for connecting the mounting means to the attachment means, the coupling means being locked when the bag means is inflated and releasable when the bag means is deflated.

* * * * *